Jan. 16, 1951      P. TOUT-KOWSKY      2,538,633

VARIABLE-SPEED GEAR OR DRIVE

Filed Dec. 22, 1945

INVENTOR.
PIERRE TOUT-KOWSKY
BY
ATTORNEYS

Patented Jan. 16, 1951

2,538,633

UNITED STATES PATENT OFFICE 2,538,633

VARIABLE-SPEED GEAR OR DRIVE

Pierre Tout-Kowsky, Paris, France

Application December 22, 1945, Serial No. 636,998
In France December 29, 1944

9 Claims. (Cl. 74—690)

This invention relates to regulators of the angular speed of a driver, and more particularly to a device for progressively varying the angular speed of a driver, as well as changing the direction thereof.

In the transmission of mechanical energy from a prime source to actuate a mechanism that operates at a different rate or at variable rates, gears and belts have been chiefly employed up to the present. However, none of these mechanisms will give more than a few fixed intermediate rates of angular velocity between the high and low rates for which the mechanism is designed.

It is an object of this invention to provide a device that will permit the selection of any desired angular speed between any designated high and low points.

A further object is to provide in the same equipment a mechanism for changing the direction of the angular speed.

Still another object is to reduce noise in the transmission of mechanical energy.

Other objects will become apparent in the course of the following specification.

The objects of the present invention are realized by providing a combination of differential and conical friction gearing for direct connection between, for example, a driving motor and a machine requiring variable angular velocity. Rather than a series of countless gears or pulleys and belts, the device of this invention gives the same result in considerably less space and with less equipment.

The invention will appear more clearly from the following description when taken in connection with the accompanying drawing showing, by way of example, preferred embodiments of the inventive idea.

Figure 1:
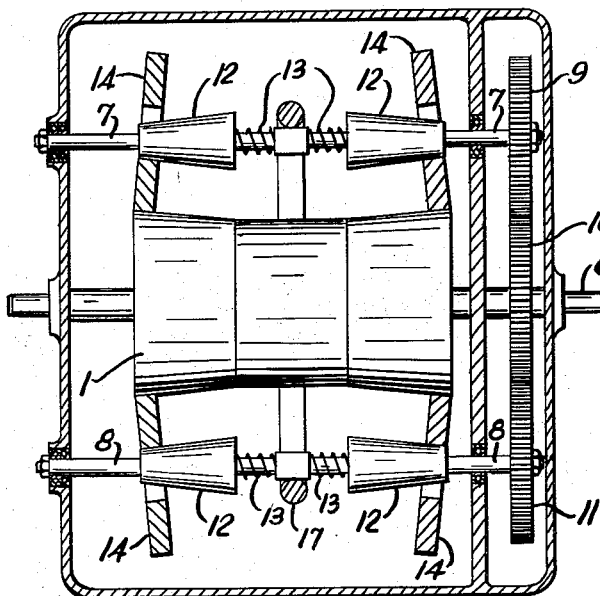
Figure 1 is a top-plan view of a device for progressively varying the angular speed of a driver, constructed in accordance with the principles of this invention.
Figure 3:
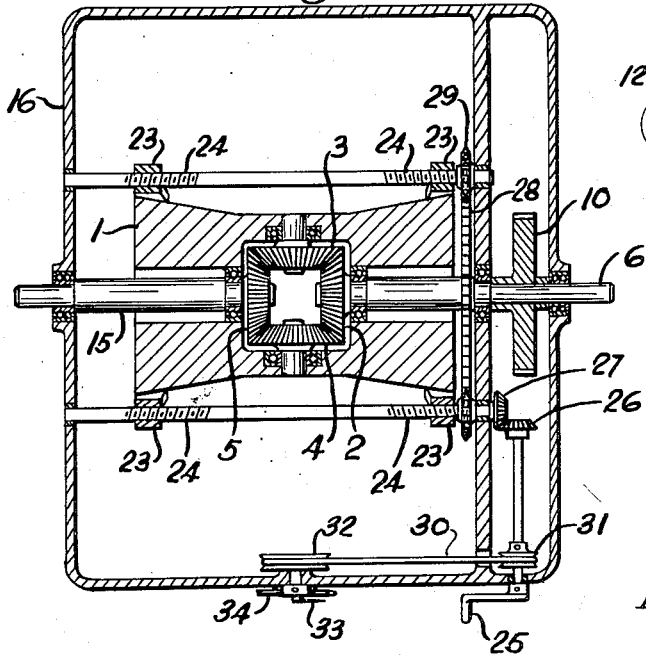
Figure 3 is a fragmentary top-plan view of a disc drive used to automatically vary the points of contact of the roller discs 14, shown in Figure 1, with the conical follower, also illustrated in Figure 1.

Referring now in greater detail to the embodiment of the device shown in Figures 1 and 3, reference numeral 6 indicates the driver shaft, 1 the conical follower, 12 the conical roller members, and 14 the roller discs.

The gears 10 and 2 are keyed upon the driver shaft 6. The gear 9 is keyed to the shaft 7 and the gear 11 to the shaft 8, the shafts 7 and 8 being parallel to the shaft 6. The conical roller members 12 are splined on shafts 7 and 8 and rotate therewith. The roller discs 14 are mounted loosely on the conical roller members 12. The conical follower 1 is loosely and rotatably mounted on the driver shaft 6. The bevel gears 3 and 4 are rotatably mounted on the follower 1 meshing with the aforementioned gear 2 and a gear 5 which is fixedly mounted on the driven shaft 15. The springs 13 prevent the conical roller members 12 from moving freely along the shafts 7 and 8. In addition, pressure rings 17 are inserted near the center of the shafts 7 and 8 in order to keep the conical roller members 14 securely against the outside surface portion of the follower 1.

The operation is as follows:

Angular velocity is imparted to the driver shaft 6 by any primary power source which is transmitted to gears 10 and 2 keyed to the shaft 6. The gear 10 meshing with gears 9 and 11 imparts angular velocity in opposite direction to the shafts 7 and 8 to which the gears 9 and 11 are keyed. The angular velocity of the shafts 7 and 8 is imparted to the splined conical roller members 12, thence to the roller discs 14 loosely mounted on said members 12, and thence to the conical follower 1. The follower 1 imparts, in turn, motion to the gears 3 and 4 rotatably mounted thereon and which mesh with the gears 2 and 5; thus the gear 5 is rotated with an angular velocity which is the same as that of the driven shaft 15 to which it is keyed. The variation in the angular velocity of the driven shaft 15 is controlled by adjusting the point of contact between the conical roller members 14 and the follower 1 by the device shown in Figure 3, which will be described hereinbelow. Since the follower 1 has an outer periphery of concave shape, and since the roller members 12 are conical, a movement of the roller discs 14 on the conical roller members 12 along the periphery of the follower 1 will vary the speed of the follower 1 and consequently the planetary rotational speed of gears 3 and 4.

Figure 2:
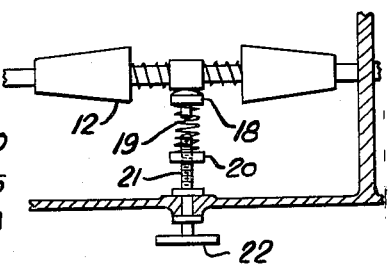
Figure 2 is a fragmentary top-plan view of another embodiment adapted to maintain the conical roller members in substantial contact with the conical follower.

Another pressure means serving as a substitute for the springs 13 is shown in Figure 2. Here, the tension of the spring 19, between a roller 18 pressing against the axis 8 of the conical roller members 12 and the slide bar 20 on the screw 21, is adjustable by the handwheel 22. By this method, pressure against the axis 8 of the conical roller members 12 is uniformly distributed and may be adjusted as desired.

The control of the positioning of the roller discs 14 of Figure 1 is shown in Figure 3. The forks 23 are mounted upon rods provided with the inverse threads 24. The forks 23 have legs which are placed over the discs 14, so that the discs 14 will be shifted along with the forks 23 when the latter are moved by the turning of the threaded rods 24. By turning the handle 25 simultaneously and uniformly as desired, the movement of the handle 25 being transferred to the rods 24 through the gears 26 and 27, and thence by belt over the pulleys 29. The rate of angular speed of the axis of the conical roller members 12 may be obtained when desired by passing the chain 30 over the pulleys 31 and 32, the latter being keyed to the speed indicator 34 and actuating the dial hand 33 thereof by any suitable means.

Figure 4:
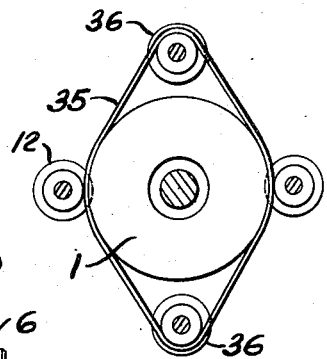
Figure 4 is an end view of another embodiment of the inventive concept wherein a friction belt is substituted for the conical roller members.

A modification of the means in transferring the energy of the driver to the follower is shown in Figure 4. Here the endless belt 35 replaces the roller discs 14 shown in Figure 1. At least two conical roller members 12 are disposed on either side of the follower 1 as shown in Figure 4, and similar members 36 at the top and bottom. An endless belt 35 is then passed over the conical members 36 and between the outside surface portion of the members 12 and follower 1. Variations in the length of the belt 35 are compensated for by moving the conical members 36 up and down as required upon their shafts, manually or by other suitable means.

It is apparent that the specific illustrations shown here have been given by way of illustration and not by way of limitation and that the structures shown above are subject to wide variation without departing from the scope or intent of the present invention. All of such variations and modifications are to be included within the scope of the present invention.

What is claimed is:

1. A variable speed mechanical drive comprising a driver shaft, a driven shaft in opposed alignment to said driver shaft, a follower substantially in the form of double cone frustums joined along the bases of minimum diameter, means loosely and rotatably mounting the follower on the driver shaft, at least three bevel gears, two of the bevel gears being keyed at the opposed ends of the shafts, the third bevel gear being rotatably mounted on the follower and adapted to mesh with the bevel gears on the shaft ends, and means applying angular velocity of opposite direction from the driver shaft to the follower.

2. A variable speed mechanical drive according to claim 1 in which the means applying angular velocity of opposite direction from the driver shaft to the follower comprises a gear keyed to the driver shaft in front of the follower, at least one conical roller member, at least one roller disc adapted to be moved along the conical roller member, a shaft for the conical roller member, the conical roller member being keyed to the last-mentioned shaft, a gear keyed at one end of the last-mentioned shaft and meshing with the gear upon the driver shaft and rotatable mounting means maintaining the last-mentioned shaft substantially parallel to the driver shaft and the roller disc in friction contact with the follower and the gears in mesh.

3. A variable speed mechanical drive according to claim 2 is characterized by a pressure ring disposed substantially at the center of the shaft for the conical roller member on the outside and adapted to maintain the roller disc in friction contact with the follower.

4. A variable speed mechanical drive in accordance with claim 1, in which the means applying angular velocity of opposite direction from the driver shaft to the follower comprises at least two conical roller members located on opposite sides of the follower, at least two other conical members located on opposite sides of the follower and substantially at right angles to the first-mentioned conical roller members, and an endless belt extending over said other conical members and between the outer surfaces of said follower and the first-mentioned conical roller members, said conical members being movable in the directions of their longitudinal axes.

5. A variable speed mechanical drive according to claim 1 in which the means applying angular velocity of opposite direction from the driver shaft to the follower comprises a gear keyed to the driver shaft in front of the follower, at least two conical roller members, a roller disc adapted to be moved along each conical roller member, a shaft for the conical roller members, means keying one conical roller member at each end of the shaft and a gear keyed at one end of the last-mentioned shaft and meshing with the gear of the driver shaft.

6. A variable speed mechanical drive according to claim 5 comprising longitudinal adjustment means, and spring tension means maintaining the conical roller members substantially at the ends of the shaft.

7. A variable speed mechanical drive according to claim 5 in which the shaft for the conical roller member is characterized by spring tension means substantially perpendicular to the longitudinal center line at the center of the shaft for the conical roller member on the outside comprising a spring, a slide bar, and a screw; means adjustably securing the slide bar over the screw with the spring disposed between the shaft and slide bar, and means adjustably securing the screw and varying the tension of the spring against the shaft.

8. A variable speed mechanical drive comprising a driver shaft, a driven shaft in alignment with said driver shaft, a follower substantially in the form of double cone frustums joined along the bases of minimum diameter, means loosely and rotatably mounting the follower on the driver shaft, at least three bevel gears, two of the bevel gears being keyed at the opposed ends of the shafts, the third bevel gear being rotatably mounted on the follower and adapted to mesh with the bevel gears on the shaft ends and means applying angular velocity of opposite direction from the driver shaft to the follower comprising a gear keyed to the driver shaft in front of the follower, at least one conical roller member, at least one roller disc adapted to be moved along the conical roller member and in frictional contact with said follower, a shaft for the conical roller member, the conical roller member being keyed to the last mentioned shaft, the last-mentioned shaft being substantially parallel to the driver shaft, a thread shaft threaded in opposite direction at each end, forks adapted to be fitted over threaded ends and holding said roller discs, and manual means for rotating the last-mentioned shaft.

9. A variable speed mechanical drive according to claim 8 which is characterized by mechanical means automatically indicating the angular velocity of the conical roller members.

PIERRE TOUT-KOWSKY.

REFERENCES CITED

The following references are of record in the file of this patent:

UNITED STATES PATENTS

| Number | Name | Date |
|---|---|---|
| 583,018 | Baker | May 27, 1897 |
| 1,001,354 | Chapman | Aug. 22, 1911 |
| 1,069,182 | Berger | Aug. 5, 1913 |
| 1,709,346 | Garrard | Apr. 16, 1929 |

FOREIGN PATENTS

| Number | Country | Date |
|---|---|---|
| 80,722 | Germany | May 20, 1895 |
| 302,904 | Italy | Nov. 11, 1932 |
| 566,389 | Germany | Dec. 17, 1932 |